(12) United States Patent
Chen et al.

(10) Patent No.: US 12,156,205 B2
(45) Date of Patent: Nov. 26, 2024

(54) DATA TRANSMISSION METHOD INCLUDING DETERMINATION OF REPETITION NUMBER OR REDUNDANCY VERSION BASED ON NUMBER OF TCI STATES, TERMINAL DEVICE AND NETWORK DEVICE

(71) Applicant: GUANGDONG OPPO MOBILE TELECOMMUNICATIONS CORP., LTD., Dongguan (CN)

(72) Inventors: Wenhong Chen, Dongguan (CN); Zhihua Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 501 days.

(21) Appl. No.: 17/541,964

(22) Filed: Dec. 3, 2021

(65) Prior Publication Data
US 2022/0095345 A1    Mar. 24, 2022

Related U.S. Application Data

(63) Continuation of application No. PCT/CN2019/090186, filed on Jun. 5, 2019.

(51) Int. Cl.
*H04W 72/1273* (2023.01)
*H04L 1/08* (2006.01)
(Continued)

(52) U.S. Cl.
CPC ........... *H04W 72/1273* (2013.01); *H04L 1/08* (2013.01); *H04L 27/2607* (2013.01); *H04W 72/23* (2023.01)

(58) Field of Classification Search
CPC . H04W 72/1273; H04W 72/23; H04W 28/04; H04W 72/53; H04L 1/08;
(Continued)

(56) References Cited

U.S. PATENT DOCUMENTS

| | | | |
|---|---|---|---|
| 2015/0131579 A1* | 5/2015 | Li | H04L 1/1858 370/329 |
| 2015/0181576 A1* | 6/2015 | Papasakellariou | H04L 1/08 370/329 |
| 2020/0314880 A1* | 10/2020 | Cirik | H04W 72/53 |

FOREIGN PATENT DOCUMENTS

| | | |
|---|---|---|
| CN | 105846977 A | 8/2016 |
| CN | 108811094 A | 11/2018 |

(Continued)

OTHER PUBLICATIONS

Request for CNIPA Patent Priority Review issued in corresponding Chinese Application No. 202110844852.9, mailed Aug. 26, 2022.
(Continued)

*Primary Examiner* — Kiet Tang
(74) *Attorney, Agent, or Firm* — BAYES PLLC

(57) ABSTRACT

The embodiment of the present application relates to a data transmission method, terminal device and network device, the method includes: determining, by a terminal device, a number of Transmission Configuration Indicator (TCI) states according to Downlink Control Information (DCI); determining, by the terminal device, a first repetition number of repetitions of a Physical Downlink Shared Channel (PDSCH) scheduled by the DCI and/or a redundancy version used for each repetition of the PDSCH scheduled by the DCI according to the number of the TCI states; and performing, by the terminal device, repetitions of the PDSCH scheduled by the DCI according to the first repetition number and/or the redundancy version.

9 Claims, 7 Drawing Sheets

(51) Int. Cl.
*H04L 27/26* (2006.01)
*H04W 72/23* (2023.01)

(58) Field of Classification Search
CPC . H04L 27/2607; H04L 1/1819; H04L 1/1845; H04L 1/1893; H04L 1/1896; H04L 5/0053; H04L 1/18; H04L 1/1858
See application file for complete search history.

(56) References Cited

FOREIGN PATENT DOCUMENTS

| CN | 108934078 A | 12/2018 |
|---|---|---|
| EP | 3906632 A1 | 11/2021 |
| WO | 2019084711 A1 | 5/2019 |

OTHER PUBLICATIONS

International Search Report issued in corresponding International Application No. PCT/CN2019/090186, mailed Mar. 12, 2020, 31 pages.
Written Opinion of the International Searching Authority issued in corresponding International Application No. PCT/CN2019/090186, mailed Mar. 12, 2020, 9 pages.
"Enhancements on multi-TRP and multi-panel transmission", Agenda Item: 7.2.8.2, Source: OPPO, 3GPP TSG RAN WG1 Meeting #96bis, R1-1904036, Xi'an, China, Apr. 8-12, 2019, 10 pages.
"Enhancements on multi-TRP and multi-panel transmission", Agenda Item: 7.2.8.2, Source: OPPO, 3GPP TSG RAN WG1 Meeting #97, R1-1906287, Reno, USA, May 13-17, 2019, 11 pages.
"Multi-TRP Enhancements", Agenda item: 7.2.8.2, Source: Qualcomm Incorporated, 3GPP TSG-RAN WG1 Meeting #97, R1-1907289, May 13-17, 2019, Reno, Nevada, USA, 25 pages.
"Summary of AI: 7.2.8.2 Enhancements on Multi-TRP/Panel Transmission of Offline Discussion", Agenda Item: 7.2.8.2, Source: Huawei, HiSilicon, 3GPP TSG RAN WG1 Meeting #97, R1 1907706, Reno, USA, May 13 17, 2019, 66 pages.
First Office Action issued in corresponding Chinese application No. 202110844852.9, mailed Nov. 28, 2022.
Second Office Action issued in corresponding Chinese application No. 202110844852.9, mailed Feb. 5, 2023.
First Office Action issued in corresponding European application No. 19931979.9, mailed Jan. 17, 2023.
Extended European Search Report issued in corresponding European Application No. 19931979.9, mailed Apr. 8, 2022, 14 pages.
"Enhancements on multi-TRP/panel transmission", R1-1813333, Source: NTT Docomo, Inc., 3GPP TSG RAN WG1 Meeting #95, Spokane, USA, Nov. 12-16, 2018, 20 pages.

\* cited by examiner

200

- 210: Determine, by a terminal device, the number of TCI states according to DCI
- 220: Determine, by the terminal device, a first repetition number of repetitions of a PDSCH scheduled by the DCI and/or a redundancy version used for each repetition of the PDSCH scheduled by the DCI according to the number of the TCI states
- 230: Perform, by the terminal device, repetitions of the PDSCH scheduled by the DCI according to the first repetition number and/or the redundancy version

FIG. 5

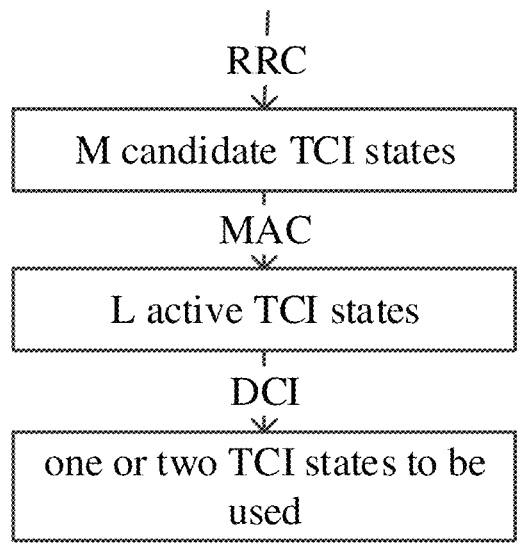

According to a number of Transmission/Reception Points (TRPs) for transmitting a Physical Downlink Shared Channel (PDSCH), determine, by a network device, a first repetition number of repetitions of the PDSCH and/or a redundancy version used for each repetition of the PDSCH — 310

Perform, by the network device, repetitions of the PDSCH according to the first repetition number and/or the redundancy version — 320

FIG. 10

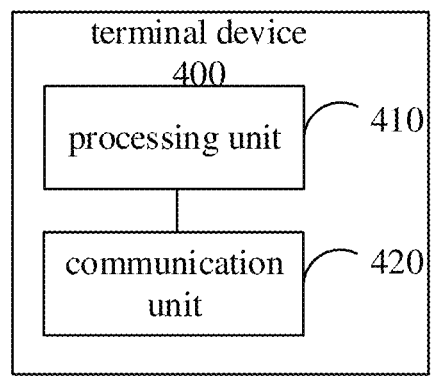

FIG. 11

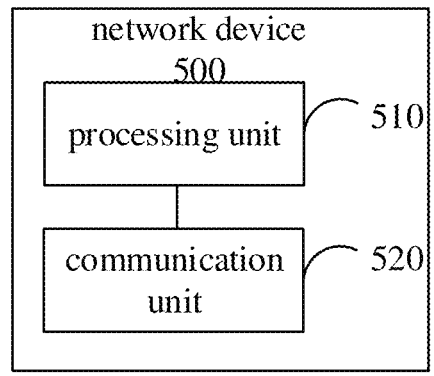

FIG. 12

DATA TRANSMISSION METHOD INCLUDING DETERMINATION OF REPETITION NUMBER OR REDUNDANCY VERSION BASED ON NUMBER OF TCI STATES, TERMINAL DEVICE AND NETWORK DEVICE

CROSS-REFERENCE TO RELATED APPLICATION

This application is a continuation of International Application No. PCT/CN2019/090186, filed on Jun. 5, 2019, the entire contents of which are incorporated herein by reference.

TECHNICAL FIELD

Embodiments of the present disclosure generally relate to communication technologies, and more particularly, to a data transmission method, a terminal device and a network device.

BACKGROUND

In order to improve the transmission reliability of the Physical Downlink Shared Channel (PDSCH), the New Radio (NR) system introduces the repetitive transmissions (repetitions) of the PDSCH. That is, PDSCHs carrying the same data can be transmitted multiple times by different slots, Transmission/Reception Points (TRPs) or redundancy versions, and so on, so as to obtain diversity gain and reduce Block Error Ratio (BLER).

When performing repetitive transmissions of the PDSCH, it may be that a single TRP performs all the repetitive transmissions of the PDSCH, or it may be that the PDSCH repetitions are performed on multiple TRPs. Therefore, how to determine the number of repetitions of the PDSCH and the redundancy versions used for the repetitions of the PDSCH in the case of different TRP numbers is a problem to be solved urgently.

SUMMARY

Embodiments of the present disclosure provide a data transmission method, a terminal device and a network device, which can dynamically determine the number of repetitions of the PDSCH and the redundancy versions used for the repetitions of the PDSCH in the case of different TRP numbers.

According to a first aspect, there is provided a data transmission method, including: determining, by a terminal device, a number of Transmission Configuration Indicator (TCI) states according to Downlink Control Information (DCI); determining, by the terminal device, a first repetition number of repetitions of a Physical Downlink Shared Channel (PDSCH) scheduled by the DCI and/or a redundancy version used for each repetition of the PDSCH scheduled by the DCI according to the number of the TCI states; and performing, by the terminal device, repetitions of the PDSCH scheduled by the DCI according to the first repetition number and/or the redundancy version.

According to a second aspect, there is provided a data transmission method, including: according to a number of Transmission/Reception Points (TRPs) for transmitting a Physical Downlink Shared Channel (PDSCH), determining, by a network device, a first repetition number of repetitions of the PDSCH and/or a redundancy version used for each repetition of the PDSCH; and performing, by the network device, repetitions of the PDSCH according to the first repetition number and/or the redundancy version.

According to a third aspect, there is provided a terminal device configured to perform the method according to the first aspect or any implementation of the first aspect.

Specifically, the terminal device includes functional modules configured to perform the method according to the first aspect or any implementation of the first aspect.

According to a fourth aspect, there is provided a network device configured to perform the method according to the second aspect or any implementation of the second aspect.

Specifically, the network device includes functional modules configured to perform the method according to the second aspect or any implementation of the second aspect.

According to a fifth aspect, there is provided a terminal device including a processor and a memory configured to store a computer program, wherein the processor is used to call and run the computer program stored in the memory to perform the method according to the first aspect or any implementation of the first aspect.

According to a sixth aspect, there is provided a network device including a processor and a memory configured to store a computer program, wherein the processor is used to call and run the computer program stored in the memory to perform the method according to the second aspect or any implementation of the second aspect.

According to a seventh aspect, there is provided a device configured to perform the method according to any one of the first to second aspects or any implementation of the first to second aspects.

Specifically, the device includes a processor configured to call and run a computer program stored in a memory to cause an apparatus in which the device is installed to perform the method according to any one of the first to second aspects or any implementation of the first to second aspects.

According to some embodiments, the device is a chip.

According to an eighth aspect, there is provided a computer-readable storage medium configured to store a computer program, wherein the computer program is configured to cause a computer to perform the method according to any one of the first to second aspects or any implementation of the first to second aspects.

According to a ninth aspect, there is provided a computer program product including computer program instructions that cause a computer to perform the method according to any one of the first to second aspects or any implementation of the first to second aspects.

According to a tenth aspect, there is provided a computer program. When the computer program is run on a computer, the computer is caused to perform the method according to any one of the first to second aspects or any implementation of the first to second aspects.

When performing repeated PDSCH transmissions, it may be that a single TRP performs all the repeated transmissions of the PDSCH, or it may be that the repeated transmissions of the PDSCH are performed on multiple TRPs. The network device may use different numbers of TRPs to perform multiple repeated transmissions of the PDSCH at different times. The numbers of TRPs are different, and the numbers of repeated PDSCH transmissions and the redundancy versions used for the repeated transmissions of the PDSCH may be different. In the above technical solutions, there is a specific relationship between the number of TCI states and the number of TRPs, for example, the number of the TCI states is equal to the number of the TRPs, so that the terminal device can obtain the number of the TRPs for performing the current repeated transmissions of the PDSCH according to the number of the TCI states in the DCI. Accordingly, the terminal device can dynamically determine the repetition number and/or redundancy versions corresponding to the number of the TRPs, and can thus support flexible switching of the number of the TRPs and improve the performance of downlink transmission.

BRIEF DESCRIPTION OF THE DRAWINGS

FIG. 5 is a schematic flowchart of a data transmission method according to an embodiment of the present disclosure.

FIG. 6 is a schematic diagram of a method for configuring TCI states for PDSCH according to an embodiment of the present disclosure.

FIG. 10 is a schematic flowchart of another data transmission method according to an embodiment of the present disclosure.

FIG. 11 is a schematic block diagram of a terminal device according to an embodiment of the present disclosure.

FIG. 12 is a schematic block diagram of a network device according to an embodiment of the present disclosure.

DETAILED DESCRIPTION

Technical solutions in embodiments of the present disclosure will be described below with reference to drawings. The described embodiments are a part of the embodiments of the present disclosure, not all of the embodiments of the present disclosure. Based on the embodiments described herein, all other embodiments obtained by those of ordinary skill in the art without creative work shall fall within the protection scope of the present disclosure.

Embodiments of the present disclosure can be applied to various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a New Radio (NR) system, an evolved NR system, a LTE-based access to unlicensed spectrum (LTE-U) system, a NR-based access to unlicensed spectrum (NR-U) system, a Universal Mobile Telecommunication System (UMTS), a Wireless Local Area Network (WLAN), Wireless Fidelity (WiFi), next-generation communication systems or other communication systems, and so on.

Generally speaking, traditional communication systems support a limited number of connections and are easy to implement. However, with the development of communication technologies, mobile communication systems will not only support traditional communications, but will also support, for example, Device to Device (D2D) communication, Machine to Machine (M2M) communication, Machine Type Communication (MTC), and Vehicle to Vehicle (V2V) communication, and so on, and embodiments of the present disclosure can also be applied to these communications systems.

According to some embodiments, the communication systems in embodiments of the present disclosure can be applied to a Carrier Aggregation (CA) scenario, or can be applied to a Dual Connectivity (DC) scenario, or can be applied to a standalone (SA) network deployment scenario.

Figure 1:
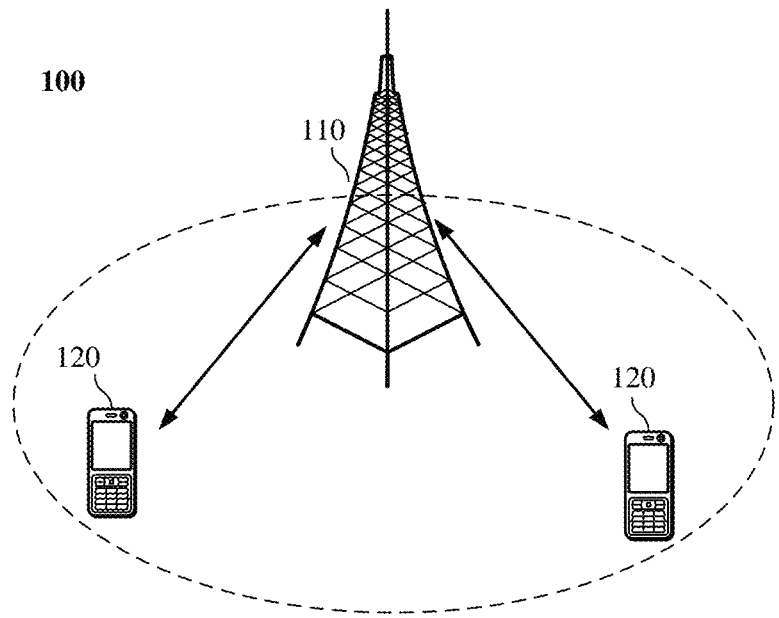
FIG. 1 is a schematic diagram of communication system architecture according to an embodiment of the present disclosure.

As an example, the communication system 100 applied in embodiments of the present disclosure may be as shown in FIG. 1. The communication system 100 includes a network device 110, and the network device 110 may be a device that communicates with a terminal device 120 (or called a communication terminal or a terminal). The network device 110 can provide communication coverage for a specific geographic area, and can communicate with terminal devices in the coverage area. According to embodiments, the network device 110 may be a base station (Base Transceiver Station, BTS) in a GSM system or a CDMA system, a base station (NodeB, NB) in a WCDMA system, an evolved base station (Evolutional Node B, eNB or eNodeB) in an LTE system, or a wireless controller in a Cloud Radio Access Network (CRAN), or the network device may be a mobile switching center, a relay station, an access point, an on-vehicle device, a wearable device, a hub, a switch, a network bridge, a router, a network side device in a 5G network, or a network device in a future evolved Public Land Mobile Network (PLMN), etc.

The communication system 100 also includes at least one terminal device 120 within the coverage area of the network device 110. The "terminal device" as used herein may be connected in the following manners (including but not limited to): the terminal device may be connected via wired lines, such as via Public Switched Telephone Networks (PSTN), Digital Subscriber Line (DSL), digital cables, and direct cable connections; and/or the terminal may be connected via another data connection/network; and/or the terminal device may be connected via a wireless interface, such as cellular networks, wireless local area network (WLAN), digital TV networks such as DVB-H networks, satellite networks, AM-FM broadcast transmitter; and/or the terminal device is connected via a device of another terminal device which is configured to receive/send communication signals; and/or the terminal device is connected via an Internet of Things (IoT) device. A terminal device set as communicating through a wireless interface may be referred to as a "wireless communication terminal", a "wireless terminal" or a "mobile terminal". Examples of the mobile terminal include but are not limited to: satellite or cellular phone; Personal Communications System (PCS) terminal that can integrate a cellular radio phone with data processing, fax, and data communication capabilities; a PDA which can include a radio phone, a pager, an Internet/intranet access, a Web browser, a memo pad, a calendar, and/or Global Positioning System (GPS) receiver; and conventional laptop and/or palmtop receivers or other electronic device including a radio telephone transceiver. The terminal device can refer to access terminal, User Equipment (UE), user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal device in 5G networks, or a terminal device in the future evolved PLMN, etc.

The network device 110 may provide services for a cell, and the terminal device 120 communicates with the network device 110 through transmission resources (for example, frequency domain resources, or in other words, spectrum resources) used by the cell. The cell may be a cell corresponding to the network device 110 (for example, base station). The cell may belong to a macro base station or a base station corresponding to a small cell. The small cell here may include: a metro cell, a micro cell, a pico cell, a femto cell, etc. These small cells have the characteristics of small coverage and low transmit power, and are suitable for providing high-speed data transmission services.

FIG. 1 exemplarily shows one network device and two terminal devices. According to other embodiments, the communication system 100 may include multiple network devices and the coverage of each network device may include other numbers of terminal devices, and embodiments of the present disclosure do not impose specific limitations on this.

According to some embodiments, the communication system 100 may further include other network entities such as a network controller or a mobility management entity, and embodiments of the present disclosure do not impose specific limitations on this.

It should be understood that a device with a communication function in the network/system in embodiments of the present disclosure may be referred to as a communication device. Taking the communication system 100 shown in FIG. 1 as an example, the communication device may include the network device 110 and the terminal devices 120 having a communication function. The network device 110 and the terminal devices 120 may be the specific devices described above, and repeated descriptions will be omitted here. The communication device may also include other devices in the communication system 100, such as a network controller, a mobility management entity, or other network entities, and embodiments of the present disclosure do not impose specific limitations on this.

It should be understood that the terms "system" and "network" are often used interchangeably herein.

In the NR system, a network device can use analog beams to transmit PDSCH. Before performing analog beamforming, the network device can determine the beam to be used by a downlink beam management procedure. The downlink beam management can be conducted based on the Channel State Information Reference Signal (CSI-RS) or the Synchronization Signal Block (SSB).

Figure 2:
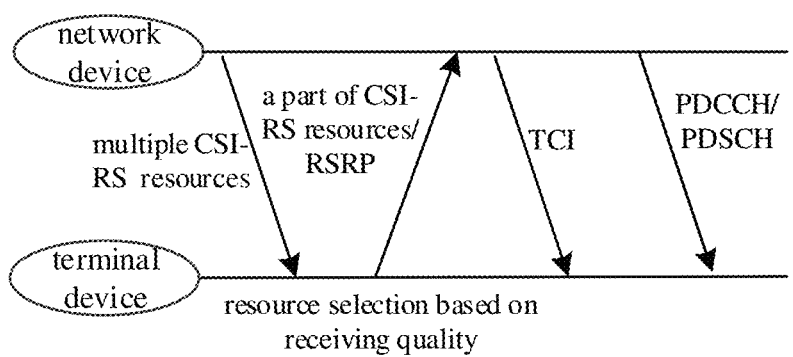
FIG. 2 is a schematic interaction diagram of downlink beam management.

Specifically, as shown in FIG. 2, the network device sends multiple SSBs or N CSI-RS resources for beam management. The terminal device can perform measurement based on the multiple SSBs or multiple CSI-RS resources, select a part of the SSBs or CSI-RS resources with the best reception quality, and report the corresponding SSB indexes or CSI-RS resource indexes and the corresponding Reference Signal Receiving Power (RSRP) to the network device. The network device determines an optimal SSB or CSI-RS resource according to the report from the terminal device, and determines the transmission beam used for the SSB or CSI-RS resource as the transmission beam used for downlink transmission, so that the transmission beam can be used to transmit a downlink control channel or a downlink data channel. Before the network device transmits the downlink control channel or the downlink data channel, the network device can indicate the corresponding Quasi-co-located (QCL) reference signal to the terminal device by a Transmission Configuration Indicator (TCI) state, so that the terminal device may use the receiving beam used to receive the QCL reference signal to receive a corresponding downlink control channel, such as a Physical Downlink Control Channel (PDCCH), or a downlink data channel.

In order to improve the transmission reliability of the PDSCH, the NR system introduces the repetitive transmissions (repetitions) of the PDSCH. That is, PDSCHs carrying the same data can be transmitted multiple times by different slots, TRPs or redundancy versions, and so on, so as to obtain diversity gain and reduce Block Error Ratio (BLER).

Figure 3:
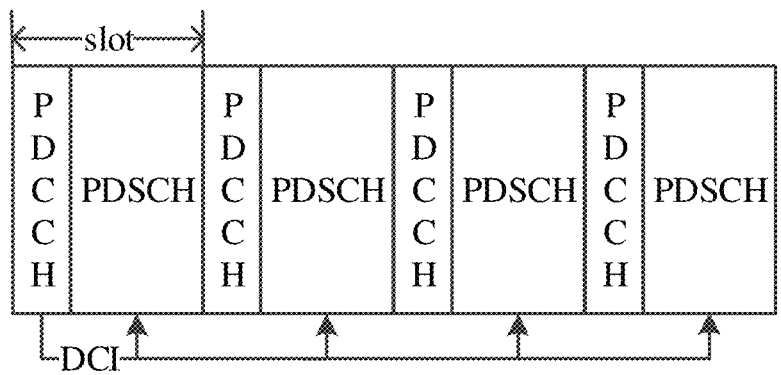
FIG. 3 shows repetitions of PDSCH based on slots.

Specifically, as shown in FIG. 3, repetitions can be performed in multiple slots. For repetitions on multiple slots, a DCI (Downlink Control Information) can schedule multiple PDSCHs carrying the same data to be transmitted on multiple consecutive slots. According to some embodiments, frequency domain resources for the repetitions of the PDSCH may be the same, and the RVs may be different. The terminal device may determine the RV for each repetition according to the RV number indicated by the DCI.

Figure 4:
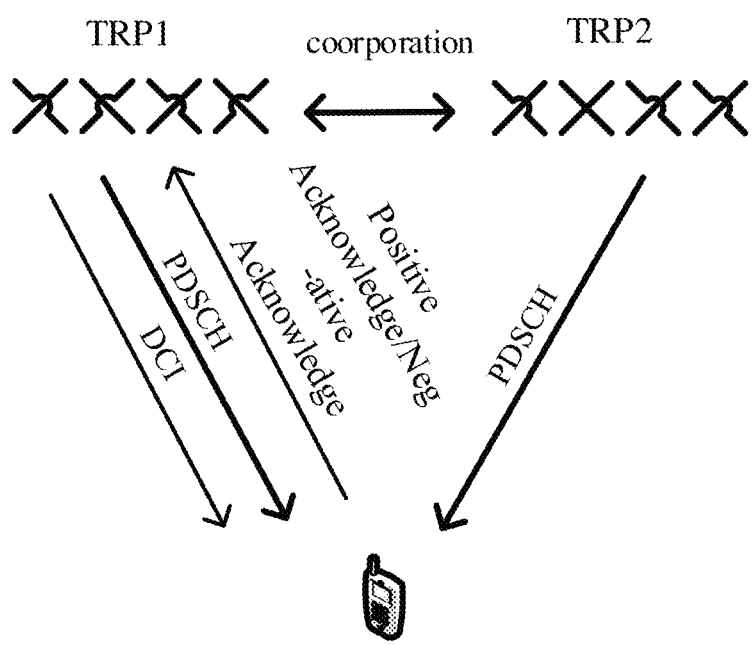
FIG. 4 shows repetitions of PDSCH based on TRPs.

As shown in FIG. 4, repetitions can also be performed on multiple TRPs. For repetitions on multiple TRPs, the PDSCHs carrying the same data can be transmitted on different TRPs using different beams (in this case, the network device can indicate multiple TCI states in one DCI).

Of course, the multi-TRP repetition method can also be combined with the multi-slot repetition method. For example, the PDSCHs can be transmitted in multiple different slots using different TRPs.

When performing PDSCH repetitions, it may that all repetitions of PDSCH are performed on a single TRP, or it may be that repetitions of PDSCH are performed on multiple TRPs, and the numbers of TRPs for PDSCH repetitions at different times may vary. For example, the number of TRPs for PDSCH repetitions in slot 1 is 1, and the number of TRPs for PDSCH repetitions in slot 2 is 2. When a network device uses different numbers of TRPs to transmit the PDSCHs, the number of corresponding PDSCH repetitions and the redundancy version used for each PDSCH repetition may be different. For example, when a network device uses different TRPs for PDSCH repetitions, the redundancy version used for each PDSCH repetition can be the same; when the network device uses the same TRP for PDSCH repetition, the redundancy version used for each PDSCH repetition can be different.

Since the terminal device cannot know the number of TRPs for PDSCH repetitions, the terminal device cannot determine the number of PDSCH repetitions and/or the redundancy version used for each PDSCH repetition.

In view of the above, embodiments of the present disclosure propose a data transmission method that can support repetitions of PDSCH in the case of single TRP transmission and multiple TRP transmission, so that the terminal device can dynamically determine the number of repetitions and/or redundancy version corresponding to the number of TRPs.

FIG. 5 is a schematic flowchart of a data transmission method 200 according to an embodiment of the present disclosure. The method in FIG. 5 may be executed by a terminal device, and the terminal device may be, for example, the terminal device 120 shown in FIG. 1. As shown in FIG. 5, the method 200 may include at least part of the following contents.

In 210, the terminal device determines the number of TCI states according to DCI.

In embodiments of the present disclosure, a TCI state may include the following configurations:
1. TCI state Identity (ID) used to identify a TCI state;
2. QCL information 1; and
3. QCL information 2.

A piece of QCL information may include the following information:
   (a) QCL type configuration; for example, the QCL type configuration can be one of QCL TypeA, QCL TypeB, QCL TypeC or QCL TypeD;
   (b) QCL reference signal configuration; for example, the QCL reference signal configuration may include the cell ID where the reference signal is located, the Bandwidth Part (BWP) ID, and the identity of the reference signal (for example, the identity may be a CSI-RS resource ID or an SSB index).

In the QCL information 1 and QCL information 2, the QCL type of at least one QCL information is one of QCL TypeA, QCL TypeB, and QCL TypeC. If another QCL information is configured, the QCL type of the QCL information is QCL TypeD.

The definitions of different QCL type configurations are as follows:
1. QCL-TypeA: {Doppler shift, Doppler spread, average delay, delay spread};
2. QCL-TypeB: {Doppler shift, Doppler spread};
3. QCL-TypeC: {Doppler shift, average delay};
4. QCL-TypeD: {Spatial Rx parameter}.

In embodiments of the present disclosure, if the network device configures the QCL reference signal of a target downlink channel as a reference SSB or reference CSI-RS resource by a TCI state and the QCL type is configured as QCL-TypeA, QCL-TypeB or QCL-TypeC, the terminal device may assume that target large-scale parameters of the target downlink channel and the reference SSB or reference CSI-RS resource are the same, so that the same corresponding receiving parameters are used for reception. The target large-scale parameters may be determined by the QCL type configuration. Similarly, if the network device configures the QCL reference signal of the target downlink channel as the reference SSB or reference CSI-RS resource by a TCI state and the QCL type is configured as QCL-TypeD, the terminal device can receive the target downlink channel using a receiving beam (i.e., Spatial Rx parameters) which is the same as the receiving beam for receiving the reference SSB or reference CSI-RS resource. Generally speaking, the target downlink channel and the reference SSB or reference CSI-RS resource of the target downlink channel are transmitted by the same TRP, the same antenna panel or the same beam on the network device side. If transmission TRPs or transmission panels or transmission beams of two downlink signals or downlink channels are different, different TCI states can be configured.

For a downlink control channel, the network device can indicate a TCI state by Radio Resource Control (RRC) signaling or RRC signaling+Media Access Control (MAC) signaling.

For a downlink data channel, such as PDSCH, referring to FIG. 6, the network device can indicate M available TCI states by RRC signaling, and activate L of the M TCI states by MAC layer signaling, and finally can indicate a part of the TCI states (for example, 1 or 2 TCI states) for the PDSCH scheduled by the DCI from the L active TCI states by a TCI state indication field in the DCI, where M and L are positive integers.

After the network device determines that the PDSCH (for the convenience of description, the PDSCH is called the target PDSCH) can be repetitively transmitted (PDSCH repetitions can be performed), the network device may indicate the number of TCI states in the DCI for scheduling the target PDSCH. Correspondingly, after receiving the DCI, the terminal device can determine the number of the TCI states according to the DCI.

As an example, DCI can explicitly indicate the number of TCI states. For example, if the number of TCI states is 2, a bit "1" in the DCI can be used to indicate that the number of TCI states is 2, and a bit "0" in the DCI can be used to indicate that the number of TCI states is 1.

As another example, DCI may implicitly indicate the number of TCI states.

According to some embodiments, the DCI may indicate the number of TCI states by indicating a TCI state. For example, DCI may indicate a TCI state 1 and a TCI state 2, and the terminal device may determine that the number of TCI states is 2.

In 220, the terminal device determines a first repetition number of repetitions of the target PDSCH and/or a redundancy version used for each repetition of the target PDSCH according to the number of the TCI states.

In embodiments of the present disclosure, each repetition of the target PDSCH transmits the same data, that is, each repetition of the target PDSCH carries the same source bit information. The redundancy version, the Demodulation Reference Signal (DMRS) port, frequency domain resources, and the beam used for each repetition of the target PDSCH may be the same or different, and embodiments of the present disclosure do not impose specific limitations on this.

It should be understood that embodiments of the present disclosure do not limit the names of the repetitions of the target PDSCH and the number of the repetitions of the target PDSCH. That is, they can also be expressed as other names. For example, the repetitions of the target PDSCH may also be referred to as multiple target PDSCHs carrying the same data or multiple aggregations of the target PDSCHs. The number of repetitions of the target PDSCH may also be referred to as the number of the target PDSCHs carrying the same data or the number of the aggregations of target PDSCHs.

According to some embodiments, the number of repetitions of the target PDSCH may be one of 1, 2, 4, and 8, for example.

In embodiments of the present disclosure, there are multiple implementations for the terminal device to determine the first repetition number of the repetitions of the target TCI according to the number of TCI states, which are described in detail below.

Method 1

Determining, by the terminal device, the first repetition number of the repetitions of the target PDSCH according to the number of the TCI states, includes: determining, by the terminal device, the number of the TCI states as the first repetition number.

For example, if the number of the TCI states indicated in the DCI is 2, the terminal device may determine that the first repetition number of repetitions of the target PDSCH is also 2.

In this case, the repetitions of the target PDSCH may have a one-to-one correspondence with the TCI states. That is, the terminal device may adopt a different TCI state each time the repetition of the target PDSCH is performed. For example, if the number of the TCI states and the first repetition number are both 2, and the TCI states include a first TCI state and a second TCI state, the first TCI state can be used for the first repetition of the target PDSCH, and the second TCI state can be used for the second repetition of the target PDSCH.

Method 2

Determining, by the terminal device, the first repetition number of the repetitions of the target PDSCH according to the number of the TCI states, includes: determining, by the terminal device, the first repetition number according to the number of the TCI states and a second repetition number indicated by higher layer signaling; and/or determining, by the terminal device, the first repetition number according to the number of the TCI states and a third repetition number indicated by the DCI.

The second repetition number indicated by the higher layer signaling may be the number of repetitions indicated by a RRC parameter.

The DCI indicates the third repetition number. As an example, the network device may indicate the third repetition number by time domain resource configuration information in the DCI.

For example, the time domain resource configuration information may explicitly indicate the third repetition number. For example, the time domain resource configuration information may indicate the first repetition number while indicating a time domain resource used for each repetition of the target PDSCH.

As another example, the time domain resource configuration information may implicitly indicate the third repetition number. For example, the time domain resource configuration information only indicates the time domain resource used for each repetition of the target PDSCH, and the terminal device may determine the third repetition number according to the time domain resource used for each repetition of the target PDSCH. For example, if the time domain resource configuration information indicates the time domain resources used for each repetition of 4 target PDSCHs, the terminal device may determine that the third repetition number is 4.

As another example, the DCI may introduce a new bit field or reserve a bit in the DCI, for specifically indicating the third repetition number.

In embodiments of the present disclosure, the second repetition number indicated by the higher layer signaling and the third repetition number indicated by the DCI can be understood as: the repetition number of repetitions of the target PDSCH when repetitions of the target PDSCH are performed using a single TRP.

Of course, the second repetition number and the third repetition number may also be preset on the terminal device according to a protocol.

It should be noted that the repetitions of the target PDSCH in embodiments of the present disclosure may include the initial transmission of the target PDSCH.

It should also be noted that the term "and/or" herein is only an association relationship describing associated objects, which means that there can be three relationships, for example, A and/or B can mean three situations: A alone, B alone, and A and B together.

In method 2, the terminal device can determine the first repetition number in two ways, which will be described separately below.

Embodiment 1

Specifically, the terminal device may determine the first repetition number in different ways depending on whether the number of the TCI states is greater than one.

In an implementation, when the number of the TCI states is equal to 1, the terminal device may determine the second repetition number indicated by higher layer signaling as the first repetition number. For example, if the second repetition number indicated by the higher layer signaling is 2, the terminal device may determine that the first repetition number of repetitions of the target PDSCH is also 2.

In another implementation, when the number of the TCI states is greater than 1, the terminal device may determine the first repetition number according to one of the following three manners.

In a first manner, the terminal device may determine the third repetition number indicated by the DCI as the first repetition number.

By combining first manner with the implementation that the number of the TCI states is 1, it can be obtained that, when the number of the TCI states is 1, the first repetition number is equal to the second repetition number indicated by the higher layer signaling; when the number of the TCI states is greater than 1, the first repetition number is equal to the third repetition number indicated by the DCI. In this case, if a new bit field is introduced in the DCI or a bit is reserved in the DCI to specifically for indicate the third repetition number, the bit can only exist when the number of the TCI states is greater than 1, and does not exist when the number of the TCI states is equal to 1.

The above technical solutions can support dynamic configuration of the first repetition number of repetitions of the target PDSCH, thereby supporting more flexible scheduling.

In a second manner, the terminal device can determine the first repetition number according to the number of the TCI states and the second repetition number indicated by the higher layer signaling.

According to some embodiments, the terminal device may randomly select one of the number of the TCI states and the second repetition number as the first repetition number.

According to some embodiments, the first repetition number may be equal to a sum of the number of the TCI states and the second repetition number. For example, if the number of the TCI states is 2 and the second repetition number is 2, the terminal device may determine that the first repetition number is 4.

According to some embodiments, the first repetition number may be equal to a product of the number of the TCI states and the second repetition number. Combining this implementation with the implementation that the number of the TCI states is 1, it can be obtained that, when the number of the TCI states is 1, the first repetition number is equal to the second repetition number indicated by the higher layer signaling; when the number of the TCI states is greater than 1, the first repetition number is the product of the second repetition number and the number of the TCI states.

According to some embodiments, the first repetition number can be the larger value of the second repetition number and the number of the TCI states. That is, the first repetition number=max(T, R), where T is the number of the TCI states, and R is the second repetition number, and T and R are positive integers. For example, if the second repetition number is 1 and the number of the TCI states is 2, the terminal device may determine that the first repetition number is 2. If the second repetition number is 4 and the number of the TCI states is 2, the terminal device can determine that the first repetition number is 4.

According to some embodiments, the first repetition number may be the smaller value of the second repetition number and the number of the TCI states. That is, the first repetition number=min(T, R). Combining this implementation with the implementation that the number of TCI states is 1, it can be obtained that, when the number of the TCI states is 1, the first repetition number is equal to the second repetition number indicated by the higher layer signaling; when the number of the TCI states is greater than 1, the first repetition number is the smaller of the second repetition number and the number of TCI states.

Table 1 is an example showing a possible way of determining the first repetition number. As can be seen from Table 1, when the number of the TCI states is 1, the first repetition number is equal to the second repetition number. That is, when the second repetition number is 1, the first repetition number is also 1; when the second repetition number is 2, the first repetition number is also 2; when the second repetition number is 4, the first repetition number is also 4. When the number of the TCI states is greater than 1, the first repetition number is the smaller value of the number of the TCI states and the second repetition number. That is, when the number of the TCI states is 2 and the second repetition number is 1, the first repetition number is 1; when the number of the TCI states is 2 and the second repetition number is 2, the first repetition number is 2; when the number of the TCI states is 2 and the second repetition number is 4, the first repetition number is 2.

TABLE 1

| Second repetition number | Number of TCI states | |
| --- | --- | --- |
| | 1 | 2 |
| 1 | 1 | 1 |
| 2 | 2 | 2 |
| 4 | 4 | 2 |

The technical solution in the second manner reuses the repetition number indication information in the higher layer signaling of the existing system. The repetition number of multi-TRP transmission can be calculated based on the number of TRPs (indicated by the number of TCI states) and the repetition number indicated by the higher layer signaling, and thus the repetition number for each TRP can be the same as that in the existing system. In addition, the technical solution in the second manner can indicate the maximum number of repetitions by the higher layer signaling, and then indicate the actual number of repetitions currently used by DCI, so that the number of repetitions of the target PDSCH can be flexibly configured.

In a third manner, the terminal device may determine the first repetition number according to the number of the TCI states and the third repetition number indicated by the DCI.

According to some embodiments, the terminal device may randomly select one of the number of the TCI states and the third repetition number as the first repetition number.

According to some embodiments, the first repetition number may be equal to a sum of the number of the TCI states and the third repetition number. For example, if the number of the TCI states is 2, and the third repetition number is 2, the terminal device may determine that the first repetition number is 4.

According to some embodiments, the first repetition number may be equal to an average of the number of the TCI states and the third repetition number.

According to some embodiments, the first repetition number may be equal to a product of the number of the TCI states and the third repetition number.

Refer to Table 2, Table 2 is an example showing a possible way of determining the first repetition number. In Table 2, it is assumed that the second repetition number configured by higher layer signaling is 2. It can be seen from Table 2 that when the number of the TCI states is 1, the first repetition number is equal to the second repetition number indicated by higher layer signaling. When the number of the TCI states is greater than 1, the first repetition number is a product of the number of the TCI states and the third repetition number. That is, when the number of the TCI states is 2 and the third repetition number is 1, the first repetition number is 2; when the number of the TCI states is 2 and the third repetition number is 2, the first repetition number is 4; when the number of the TCI states is 2 and the third repetition number is 4, the first repetition number is 8.

TABLE 2

| Third repetition number | Number of TCI states | |
| --- | --- | --- |
| | 1 | 2 |
| 1 | 2 | 2 |
| 2 | 2 | 4 |
| 4 | 2 | 8 |

According to some embodiments, the first repetition number may be the larger value of the third repetition number and the number of the TCI states. That is, the first repetition number=max (T, N), where N is the third repetition number, and N is a positive integer. For example, if the third repetition number is 1 and the number of the TCI states is 2, the terminal device may determine that the first repetition number is 2. If the third repetition number is 4 and the number of the TCI states is 2, the terminal device may determine that the first repetition number is 4.

According to some embodiments, the first repetition number may be the smaller value of the third repetition number and the number of the TCI states, that is, the first repetition number=min (T, N).

In the technical solution of the third manner, DCI may only indicate the number of repetitions of the target PDSCH using a single TRP and does not need to indicate the number of repetitions depending on the change of the number of TRPs; the number of repetitions of the target PDSCH using multiple TRPs may be calculated according to the number of the TRPs (represented by the number of the TCI states) and the number of repetitions of the target PDSCH using the single TRP.

In the technical solutions of Embodiment 1, when the number of the TCI states is 1, the indication method of the number of repetitions of the target PDSCH in the existing system can be reused as much as possible, thereby reducing the complexity of the terminal device. When the number of the TCI states is greater than 1, a new way to determine the number of repetitions can be introduced, so that multiple TRP transmissions can be supported.

Embodiment 2

The terminal device may determine the first repetition number according to the number of the TCI states and a fourth repetition number.

The fourth repetition number is a repetition number indicated by the higher layer signaling or DCI. When the fourth repetition number is the repetition number indicated by higher layer signaling, the fourth repetition number is the same as the second repetition number; when the fourth repetition number is the repetition number indicated by the DCI, the fourth repetition number is the same as the third repetition number.

As an example, the terminal device may randomly select one of the number of the TCI states and the fourth repetition number as the first repetition number.

As another example, the first repetition number may be equal to a sum of the number of the TCI states and the fourth repetition number.

As another example, the first repetition number may be equal to an average of the number of the TCI states and the fourth repetition number.

As another example, the first repetition number may be equal to a product of the number of the TCI states and the fourth repetition number.

Table 3 shows a possible method of determining the first repetition number. It can be seen from Table 3 that the first repetition number is the product of the number of the TCI states and the fourth repetition number. For example, when the number of the TCI states is 2 and the fourth repetition number is 4, the first repetition number is 8; when the number of the TCI states is 1 and the fourth number of repetitions is 2, the first repetition number is two.

TABLE 3

|  | Number of TCI states | | |
|---|---|---|---|
| Fourth repetition | 1 | 2 | 4 |
| 1 | 1 | 2 | 4 |
| 2 | 2 | 4 | 8 |
| 4 | 4 | 8 | 8 or not supported |

As another example, the first repetition number may be the larger value of the fourth repetition number and the number of the TCI states, that is, the first repetition number=max (T, P), where P is the fourth repetition number.

As another example, the first repetition number may be the smaller value of the fourth repetition number and the number of the TCI states, that is, the first repetition number=min (T, P).

The main difference between Embodiment 2 and Embodiment 1 is that, Embodiment 2 can directly calculate the first repetition number instead of determining first which method is used to determine the first repetition number according to the number of the TCI states. The advantage of this method is that, when the number of the TCI states is 1 (that is, repetitions of the target PDSCH is conducted using a single TRP), the number of repetitions of the target PDSCH is the same as that in the existing system when using a single TRP, thus retaining good backward compatibility.

It should be understood that in embodiments of the present disclosure, "first", "second", "third" and "fourth" are only used to distinguish different objects, but cannot be considered as constituting any limitations on the scope of embodiments of the present disclosure.

The above contents describe the implementations in which the terminal device determines the first repetition number according to the number of the TCI states. The following will describe implementations in which the terminal device determines the redundancy version used for each repetition of the target PDSCH according to the number of the TCI states.

Embodiment 1

When the number of the TCI states is equal to 1, the terminal device can determine the redundancy version used for each repetition of the target PDSCH according to redundancy version indication information in the DCI or a redundancy version sequence configured by the RRC signaling.

According to some embodiments, the redundancy version sequence configured by the RRC signaling may include but is not limited to any one of the following: {0, 2, 3, 1}, {0, 0, 0, 0} and {0, 3, 0, 3}.

According to some embodiments, the redundancy version indication information in the DCI may be carried in any field in the DCI, that is, the redundancy version indication information may reuse any field in the DCI. Alternatively, a new bit field may be introduced in the DCI to specifically carry the redundancy version indication information.

When the terminal device determines the redundancy version used for each repetition of the target PDSCH according to the redundancy version indication information in the DCI, the terminal device can determine the redundancy version used for each repetition of the target PDSCH according to the redundancy version indication information in the DCI and Table 4.

TABLE 4

| RV value indicated by the redundancy version indication information | redundancy version used for n-th repetition | | | |
|---|---|---|---|---|
|  | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

For example, if the first repetition number of the repetitions of the target PDSCH is 4, and the RV value indicated by the redundancy version indication information in the DCI is 2, it can be obtained according to Table 4 that the redundancy version used for the 0-th repetition of the target PDSCH is 2, the redundancy version used for the first repetition of the target PDSCH is 3, the redundancy version used for the second repetition of the target PDSCH is 1, and the redundancy version used for the third repetition of the target PDSCH is 0.

When the number of the TCI states is greater than 1, the terminal device may determine the redundancy versions used for repetitions of the target PDSCH with different TCI states according to the redundancy version indication information in the DCI.

According to some embodiments, the redundancy versions used for repetitions of the target PDSCH with different TCI states may be the same, or there may be a cyclic shift relationship among the redundancy versions used for repetitions of the target PDSCH with different TCI states. For example, the number of the TCI states is 2 and the TCI states include a first TCI state and a second TCI state, a first redundancy version used for the repetition of the target PDSCH using the first TCI state is {0, 2, 3, 1}, and a second redundancy version used for the repetition of the target PDSCH using the second TCI state may be the same as the first redundancy version, that is, {0, 2, 3, 1}, or there may be a cyclic shift relationship between the second redundancy version and the first redundancy version, and in this case, the second redundancy version may be {3, 1, 0, 2}, for example.

According to some embodiments, if there is a cyclic shift relationship among the redundancy versions used for the repetitions of the target PDSCH using different TCI states, the number of shifts and direction of the cyclic shift may be negotiated between the terminal device and the network device. For example, the terminal device and the network device negotiate one right shift. Or, the number of shifts and direction of the cyclic shift can be specified in a protocol. Or, the number of shifts and direction of the cyclic shift can be configured by the network device. For example, the network device determines left shift by 3, and then the network device can send configuration information to the terminal device, and the configuration information is used to indicate that the direction and the number of shifts of the cyclic shift is left shift by 3. Or, the number of shifts of the cyclic shift can be obtained based on the number of the TCI states.

According to the redundancy version indication information in the DCI, the terminal device can determine the redundancy versions used for the repetitions of the target PDSCH with different TCI states in two implementations. In one implementation, it is assumed that the number of the TCI states is 2 and the TCI states include a first TCI state and a second TCI state. The terminal device can first determine a first redundancy version used for the repetitions of the target PDSCH using the first TCI state, and then the terminal device can determine a second redundancy version used for the repetitions of the target PDSCH using the second TCI state according to the first redundancy version.

According to some embodiments, in the process in which the terminal device determines the first redundancy version, the terminal device may determine the first redundancy version based on Table 4.

Figure 7:
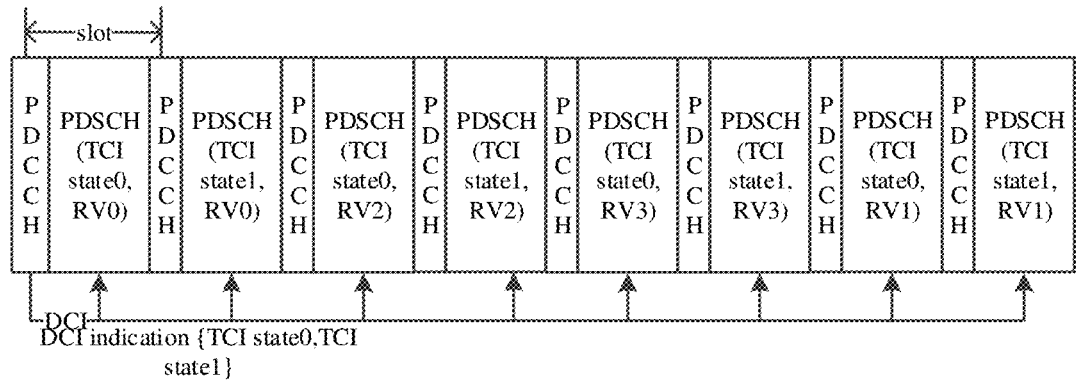
FIG. 7 is a schematic diagram showing redundancy versions used for repetitions of PDSCH with different TCI states according to an embodiment of the present disclosure.

For example, if the first redundancy version determined by the terminal device based on Table 4 is {0, 2, 3, 1}, the terminal device can determine the second redundancy version according to the first redundancy version {0, 2, 3, 1}. The determined second redundancy version may be {0, 2, 3, 1} or {3, 1, 0, 2}, for example. The first redundancy version and the second redundancy version determined by the terminal device may be specifically as shown in FIG. 7.

In another implementation, the terminal device may determine the first redundancy version and the second redundancy version according to the redundancy version indication information in the DCI. In this implementation, the determination of the second redundancy version by the terminal device is not based on the first redundancy version. For example, the terminal device may simultaneously determine the first redundancy version and the second redundancy version based on Table 4.

In embodiment 1, because different TCI states correspond to different TRPs, embodiment 1 allocates redundancy versions to the target PDSCHs transmitted by different TRPs, so that polling of redundancy versions can be performed within each TRP to improve reliability of retransmission.

Embodiment 2

As a possible embodiment, the terminal device may determine the redundancy version sequences used for repetitions of the target PDSCH according to the redundancy version indication information in the DCI, and when the numbers of the TCI states are different, the redundancy version sequences indicated by the redundancy version indication information may be different.

That is, a third redundancy version sequence may be different from a fourth redundancy version sequence, where the third redundancy version sequence is the redundancy version sequence indicated by the redundancy version indication information when the number of the TCI states is 1, and the fourth redundancy version sequence is the redundancy version sequence indicated by the redundancy version indication information when the number of the TCI states is greater than 1.

As an example, if the number of the TCI states is equal to 1, the third redundancy version sequence indicated by the redundancy version indication information in the DCI may be as shown in Table 4. If the number of the TCI states is greater than 1, the fourth redundancy version sequence indicated by the redundancy version indication information in the DCI may be as shown in one of Table 5 to Table 7.

TABLE 5

| RV value indicated by | redundancy version used for n-th repetition | | | |
|---|---|---|---|---|
| the redundancy version indication information | $\lfloor n/2 \rfloor \bmod 4 = 0$ | $\lfloor n/2 \rfloor \bmod 4 = 1$ | $\lfloor n/2 \rfloor \bmod 4 = 2$ | $\lfloor n/2 \rfloor \bmod 4 = 3$ |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

TABLE 6

| RV value indicated by | redundancy version used for n-th repetition | | | |
|---|---|---|---|---|
| the redundancy version indication information | n mod (N/2) = 0 | n mod (N/2) = 1 | n mod (N/2) = 2 | n mod (N/2) = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

TABLE 7

| RV value indicated by | redundancy version used for n-th repetition | | | |
|---|---|---|---|---|
| the redundancy version indication information | n mod 4 = 0 | n mod 4 = 1 | n mod 4 = 2 | n mod 4 = 3 |
| 0 | 0 | 2 | 3 | 1 |
| 2 | 0 | 3 | 0 | 3 |
| 3 | 0 | 0 | 3 | 3 |
| 1 | 0 | 0 | 0 | 0 |

In embodiments of the present disclosure, Table 4 to Table 7 may be preset on the terminal device as specified by a protocol. Alternatively, Table 4 to Table 7 may be configured by the network device. For example, the network device may configure Table 4 to Table 7 to the terminal device by RRC signaling.

As another possible embodiment, the terminal device may determine the redundancy versions used for repetitions of the target PDSCH according to the redundancy version sequence indicated by the RRC signaling, and when the numbers of TCI states are different, the RRC signaling may also be different, and the redundancy version sequences configured by the RRC signaling may be different.

Specifically, the network device can configure two redundancy version sequences by different RRC signaling. One sequence can be used when the number of the TCI states is one, and one sequence can be used when the number of the TCI states is greater than one. The terminal device can obtain the redundancy version used for repetitions of the target PDSCH from the corresponding RRC signaling according to the current number of the TCI states.

For example, the two redundancy version sequences configured by the network device by the RRC signaling are {0, 2, 3, 1} and {0, 3, 0, 3}, {0, 2, 3, 1} is used in the case where the number of the TCI states is 1, and {0, 3, 0, 3} is used in the case where the number of the TCI states is greater than 1. When the number of the TCI states is 1, the terminal device can determine that the redundancy version used for repetitions of the target PDSCH is {0, 2, 3, 1}; and when the number of the TCI states is greater than 1, the terminal device can determine that the redundancy version used for repetitions of the target PDSCH is the configured redundancy version sequence {0, 3, 0, 3}.

Embodiment 3

According to some embodiments, if the number of the TCI states is 1, the terminal device may determine that the redundancy version used for each repetition of the target PDSCH is different.

In this case, embodiments of the present disclosure do not limit the manner in which the terminal device determines the redundancy version used for each repetition of the target PDSCH. For example, the terminal device may determine the redundancy version used for each repetition of the target PDSCH according to Table 4. Alternatively, the terminal device may determine the redundancy version used for each repetition of the target PDSCH according to the redundancy version sequence configured by the RRC signaling.

Figure 8:
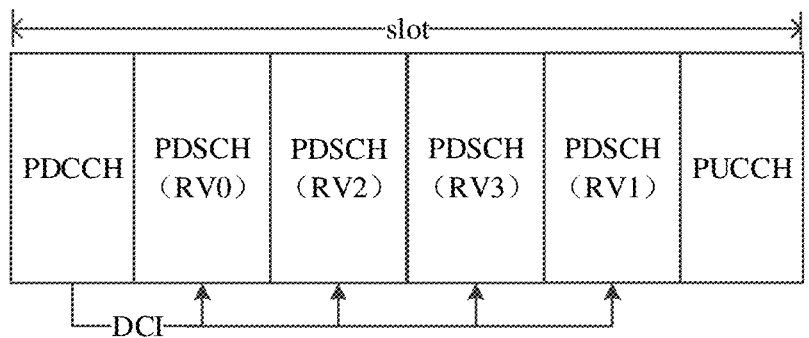
FIG. 8 is a schematic diagram showing redundancy versions used for repetitions of PDSCH when the number of TCI states is equal to 1 according to an embodiment of the present disclosure.

Referring to FIG. 8, FIG. 8 shows the redundancy version used for each repetition of the target PDSCH when the number of the TCI states is 1. It can be seen that the redundancy versions used for the repetitions of the target PDSCH are {0, 2, 3, 1}, and the redundancy versions used for the four repetitions are different.

According to some embodiments, if the number of the TCI states is greater than 1, the terminal device may determine that a part of the redundancy versions used for the repetitions of the target PDSCH are the same.

According to some embodiments, the part of the redundancy versions used for the repetitions of the target PDSCH that are the same may be pre-agreed by the terminal device and the network device, or may be stipulated by a protocol.

Figure 9:
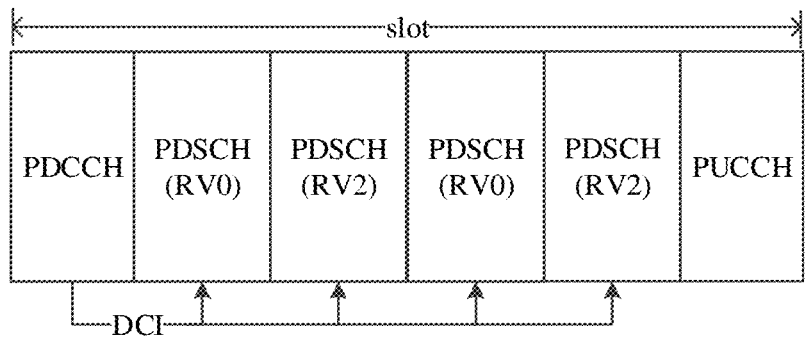
FIG. 9 is a schematic diagram showing redundancy versions used for repetitions of PDSCH when the number of TCI states is greater than 1 according to an embodiment of the present disclosure.

For example, a redundancy version used in the first half of the repetitions of the target PDSCH may be the same as a redundancy version used in the second half of the repetitions. FIG. 9 shows a schematic diagram of the redundancy versions used in the first half of the repetitions of the target PDSCH and the redundancy versions used in the second half of the repetitions. It can be seen from FIG. 9 that the redundancy version used in the repetitions of the target PDSCH For {0, 2, 0, 2}, the redundancy versions used in the first half of the repetitions of the target PDSCH are the same as the redundancy versions used in the second half of the repetitions.

For another example, the redundancy versions used for odd-numbered repetitions and even-numbered repetitions of the target PDSCH may be the same. For example, the redundancy versions used for repetitions of the target PDSCH are {0, 0, 2, 2}.

For another example, the redundancy versions used for the middle number of repetitions of the target PDSCH may be the same. For example, the first repetition number of the repetitions of the target PDSCH is 4, including 0-th, first, second, and third repetitions. The redundancy versions for the first and second repetitions of the target PDSCH are the same, and the redundancy version used for the repetitions of the target PDSCH may be {0, 2, 2, 3}, for example.

It should be noted that Tables 1 to 7 are only some exemplary examples of the embodiments of the present disclosure, and do not limit embodiments of the present disclosure, and any corresponding relationship obtained based on modifications of Tables 1 to 7 fall within the protection scope of the present disclosure.

It should also be noted that the terms "redundancy version" and "redundancy version sequence" in embodiments of the present disclosure are often used interchangeably.

In embodiments of the present disclosure, the DCI may indicate the first repetition number and/or the redundancy version used for each repetition of the target PDSCH. In this way, the terminal device can directly determine the first repetition number and/or the redundancy version used for each repetition of the target PDSCH according to the indication of the DCI.

In 230, the terminal device performs repetitions of the target PDSCH according to the first repetition number and/or the redundancy version.

According to some embodiments, the terminal device may perform repetitions of the target PDSCH in multiple adjacent slots according to the first repetition number and/or the redundancy version.

According to some embodiments, the terminal device may perform repetitions of the target PDSCH in multiple adjacent mini-slots or multiple non-adjacent mini-slots according to the first repetition number and/or the redundancy version.

One mini-slot may include multiple consecutive Orthogonal Frequency Division Multiplexing (OFDM) symbols.

Of course, the terminal device may also perform repetitions of the target PDSCH in other time units according to the first repetition number and/or the redundancy version.

In embodiments of the present disclosure, the method 200 may further include: after the terminal device receives the first repetition number of the target PDSCHs, the terminal device may combine the first repetition number of the target PDSCHs, and perform detection on the combined target PDSCHs.

According to some embodiments, there are many methods for the terminal device to combine the first repetition number of the target PDSCHs, which are not specifically limited in the present disclosure. For example, the terminal device may perform soft bit combination on the first repetition number of the target PDSCHs.

In embodiments of the present disclosure, when performing repeated PDSCH transmissions, it may be that a single TRP performs all the repeated transmissions of the PDSCH, or it may be that the repeated transmissions of the PDSCH are performed on multiple TRPs. The network device may use different numbers of TRPs to perform multiple repeated transmissions of the PDSCH at different times. The numbers of TRPs are different, and the numbers of repeated PDSCH transmissions and the redundancy versions used for the repeated transmissions of the PDSCH may be different. In the above technical solutions, there is a specific relationship between the number of TCI states and the number of TRPs, for example, the number of the TCI states is equal to the number of the TRPs, so that the terminal device can obtain the number of the TRPs for performing the current repeated transmissions of the PDSCH according to the number of the TCI states in the DCI. Accordingly, the terminal device can dynamically determine the repetition number and/or redundancy versions corresponding to the number of the TRPs, and can thus support flexible switching of the number of the TRPs and improve the performance of downlink transmission.

The foregoing describes in detail the data transmission method according to embodiments of the present disclosure from the perspective of the terminal device with reference to FIGS. 5 to 9, and the following will describe the data transmission method according to embodiments of the present disclosure in detail from the perspective of the network device with reference to FIG. 10.

FIG. 10 is a schematic flowchart of a data transmission method 300 according to an embodiment of the present disclosure. The method described in FIG. 10 may be executed by a network device, and the network device may be, for example, the network device 110 shown in FIG. 1. As shown in FIG. 10, the method 300 may include at least part of the following contents.

In 310, the network device determines a first repetition number of repetitions of the target PDSCH and/or a redundancy version used for each repetition of the target PDSCH according to the number of TRPs for transmitting the target PDSCH.

In embodiments of the present disclosure, the network device determines that the target PDSCH can be repeatedly transmitted, and determines that the number of the TRPs for the transmissions of the target PDSCH and its repetitions is T. Then, the network device may determine the number of TCI states indicated in the DCI which schedules the target PDSCH according to the number of TRPs.

According to some embodiments, the number of the TCI states can be equal to the number of the TRPs.

Next, the network device may send the DCI for scheduling the target PDSCH to the terminal device. The DCI is used to indicate the number of the TCI states.

As an example, the network device may pre-configure S groups of TCI states by MAC layer signaling, and indicate one group of TCI states by log 25 bit indication information in the DCI. Each group of TCI states includes T TCI states, and S is a positive integer As another example, the network device may pre-configure S groups of TCI states by MAC layer signaling, and each group of TCI states includes at most T_max TCI states (for example, it may be 1, 2, . . . , T_max TCI states). The network device can indicate one group of TCI states by log 25 bit indication information in the DCI, and the indicated group of TCI states includes T TCI states, and T is smaller than or equal to S_max, typically, S_max=2, T=1 or T=2.

It should be understood that although the method 200 and the method 300 are described above separately, this does not mean that the method 200 and the method 300 are independent, and the descriptions of the method 200 and the method 300 may refer to each other if there is no contradiction. For example, the descriptions in the method 200 regarding the determination of the first repletion number and/or redundancy version by the terminal device may be applicable to the method 300. For the sake of brevity, the implementations in which the network device determines the first repetition number and the redundancy version according to the number of TRPs will not be described in detail.

In 320, the network device performs repetitions of the target PDSCH according to the first repetition number and/or the redundancy version.

According to some embodiments, the network device may perform repetitions of the target PDSCH in multiple adjacent slots according to the first repetition number and/or the redundancy version.

According to some embodiments, the network device may perform repetitions of the target PDSCH in multiple adjacent mini-slots or multiple non-adjacent mini-slots according to the first repetition number and/or the redundancy version.

The exemplary embodiments of the present disclosure are described in detail above with reference to the accompanying drawings. However, the present disclosure is not limited to the specific details in the foregoing embodiments. Within the scope of the technical concept of the present disclosure, many simple modifications can be made to the technical solutions of the present disclosure and these simple modifications fall within the protection scope of the present disclosure.

For example, various specific technical features described in the above-mentioned embodiments can be combined in any suitable manner if there is no contradiction between these features. In order to avoid unnecessary repeated descriptions, various possible combinations are not described in the present disclosure. Explain separately.

For another example, various different implementations of the present disclosure can also be combined arbitrarily, as long as such combination is not contrary to the idea of the present disclosure, and such combination should also be regarded as the contents disclosed in the present disclosure.

It should be understood that, in the various method embodiments of the present disclosure, the sequence numbers of the foregoing processes do not mean the execution order of the processes. The execution order of the processes should be determined by their functions and internal logics, and the sequence numbers of the foregoing processes should not be considered as constituting any limitation on the embodiments of the present disclosure.

The data transmission method according to embodiments of the present disclosure is described in detail above. The communication device according to embodiments of the present disclosure will be described below with reference to FIG. 11 to FIG. 13. The technical features described in the method embodiments are applicable to the following device embodiments.

FIG. 11 shows a schematic block diagram of a terminal device 400 according to an embodiment of the present disclosure. As shown in FIG. 11, the terminal device 400 includes: a processing unit 410 and a communication unit 420.

The processing unit 410 is configured to determine a number of TCI states according to DCI.

The processing unit 410 is further configured to determine a first repetition number of repetitions of a PDSCH scheduled by the DCI and/or a redundancy version used for each repetition of the PDSCH scheduled by the DCI according to the number of the TCI states.

The communication unit 420 is configured to perform repetitions of the PDSCH scheduled by the DCI according to the first repetition number and/or the redundancy version.

According to some embodiments of the present disclosure, the processing unit 410 is configured to: determine the number of the TCI states as the first repetition number.

According to some embodiments of the present disclosure, the processing unit 410 is configured to: determine the first repetition number according to the number of the TCI states and a second repetition number indicated by higher layer signaling; and/or determine the first repetition number according to the number of the TCI states and a third repetition number indicated by the DCI.

According to some embodiments of the present disclosure, the processing unit 410 is configured to: when the number of the TCI states is equal to 1, determine the second repetition number indicated by the higher layer signaling as the first repetition number; and when the number of the TCI states is greater than 1, determine the third repetition number indicated by the DCI as the first repetition number, or determine the first repetition number according to the number of the TCI states and the second repetition number, or determine the first repetition number according to the number of the TCI states and the third repetition number.

According to some embodiments of the present disclosure, the processing unit 410 is configured to: determine any one of the following values as the first repetition number: a product of the second repetition number and the number of the TCI states; a larger value of the second repetition number and the number of the TCI states; or a smaller value of the second repetition number and the number of the TCI states.

According to some embodiments of the present disclosure, the processing unit 410 is configured to: determine any one of the following values as the first repetition number: a product of the third repetition number and the number of the TCI states; a larger value of the third repetition number and the number of the TCI states; or a smaller value of the third repetition number and the number of the TCI states.

According to some embodiments of the present disclosure, the DCI includes time domain resource configuration information, and the time domain resource configuration information is used to indicate the third repetition number.

According to some embodiments of the present disclosure, the processing unit 410 is configured to: when the number of the TCI states is equal to 1, determine the redundancy version used for each repetition of the PDSCH scheduled by the DCI according to redundancy version indication information in the DCI or a redundancy version sequence indicated by Radio Resource Control (RRC) signaling; or when the number of the TCI states is greater than 1, determine redundancy versions used for repetitions of the PDSCH using different TCI states according to the redundancy version indication information in the DCI.

According to some embodiments of the present disclosure, the processing unit 410 is configured to: determine a redundancy version used for a repetition of the PDSCH using a first TCI state according to the redundancy version indication information, wherein the TCI states include at least the first TCI state and a second TCI state; and determine a redundancy version used for a repetition of the PDSCH using the second TCI state according to the redundancy version used for the repetition of the PDSCH using the first TCI state.

According to some embodiments of the present disclosure, the redundancy versions used for the repetitions of the PDSCH using different TCI states are the same, or there is a cyclic shift relationship among the redundancy versions used for the repetitions of the PDSCH using different TCI states.

According to some embodiments of the present disclosure, the processing unit 410 is configured to: determine redundancy version sequences used for the repetitions of the PDSCH scheduled by the DCI according to redundancy version indication information in the DCI, wherein when numbers of the TCI states are different, the redundancy version sequences indicated by the redundancy version indication information are also different; or determine the redundancy version used for each repetition of the PDSCH scheduled by the DCI according to a redundancy version sequence indicated by RRC signaling, wherein when numbers of the TCI states are different, the RRC signaling is different.

According to some embodiments of the present disclosure, the processing unit 410 is configured to: when the number of the TCI states is equal to 1, determine that redundancy versions used for the repetitions of the PDSCH scheduled by the DCI are all different; or when the number of the TCI states is greater than 1, determine that a part of redundancy versions used for the repetitions of the PDSCH scheduled by the DCI are the same.

According to some embodiments of the present disclosure, when the number of the TCI states is greater than 1, redundancy versions used for a first half of the repetitions of the PDSCH scheduled by the DCI and redundancy versions used for a second half of the repetitions are the same; or redundancy versions used for odd-numbered repetitions of the PDSCH scheduled by the DCI are the same as redundancy versions used for even-numbered repetitions of the PDSCH.

According to some embodiments of the present disclosure, the communication unit 420 is configured to: according to the first repetition number and/or the redundancy version, perform the repetitions of the PDSCH scheduled by the DCI in multiple adjacent slots or multiple adjacent mini slots or multiple non-adjacent mini slots.

According to some embodiments of the present disclosure, the processing unit 410 is further configured to: combine the first repetition number of PDSCHs scheduled by the DCI to obtain a combined PDSCH; and detect the combined PDSCH.

It should be understood that the terminal device 400 may correspond to the terminal device in the method 200, and can implement the corresponding operations performed by the terminal device in the method 200. For the sake of brevity, details are not described here again.

FIG. 12 shows a schematic block diagram of a network device 500 according to an embodiment of the present disclosure. As shown in FIG. 12, the network device 500 includes: a processing unit 510 and a communication unit 520.

The processing unit 510 is configured to, according to a number of TRPs for transmitting a PDSCH, determine a first repetition number of repetitions of the PDSCH and/or a redundancy version used for each repetition of the PDSCH.

The communication unit 520 is configured to perform repetitions of the PDSCH according to the first repetition number and/or the redundancy version.

According to some embodiments of the present disclosure, the processing unit 510 is configured to: determine the first repetition number according to the number of the TRPs and a second repetition number indicated in advance by higher layer signaling.

According to some embodiments of the present disclosure, the processing unit 510 is configured to: determine any one of the following values as the first repetition number: a product of the second repetition number and the number of the TRPs; a larger value of the second repetition number and the number of the TRPs; or a smaller value of the second repetition number and the number of the TRPs.

According to some embodiments of the present disclosure, the processing unit 510 is configured to: when the number of the TRPs is equal to 1, determine that redundancy versions used for the repetitions of the PDSCH are all different; or when the number of the TCI states is greater than 1, determine that a part of redundancy versions used for the repetitions of the PDSCH are the same.

According to some embodiments of the present disclosure, when the number of the TCI states is greater than 1, redundancy versions used for a first half of the repetitions of the PDSCH and redundancy versions used for a second half of the repetitions are the same; or redundancy versions used for odd-numbered repetitions of the PDSCH are the same as redundancy versions used for even-numbered repetitions of the PDSCH.

According to some embodiments of the present disclosure, the communication unit 520 is configured to: according to the first repetition number and/or the redundancy version, perform the repetitions of the PDSCH in multiple adjacent slots or multiple adjacent mini slots or multiple non-adjacent mini slots.

It should be understood that the network device 500 may correspond to the network device in the method 300, and can implement the corresponding operations performed by the network device in the method 300. For the sake of brevity, details are not described here again.

Figure 13:
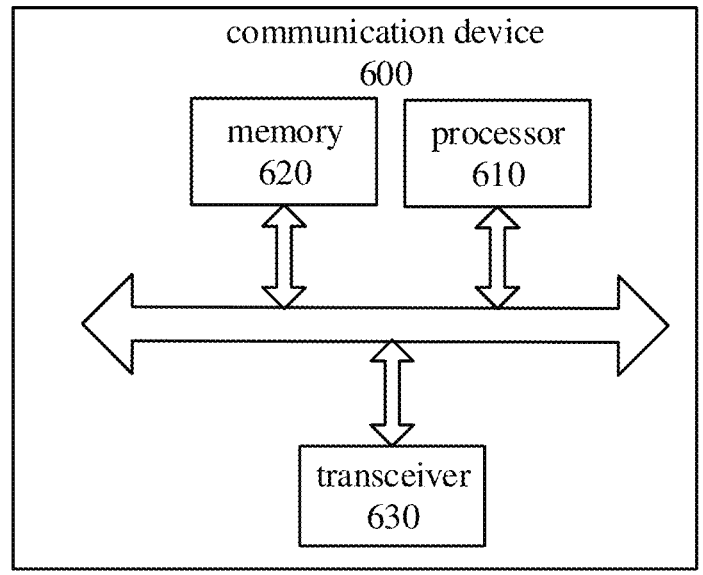
FIG. 13 is a schematic block diagram of a communication device according to an embodiment of the present disclosure.

FIG. 13 is a schematic structural diagram of a communication device 600 according to an embodiment of the present disclosure. The communication device 600 shown in FIG. 13 includes a processor 610, and the processor 610 may call and run a computer program from a memory to perform the method in embodiments of the present disclosure.

According to embodiments, as shown in FIG. 13, the communication device 600 may further include a memory 620. The processor 710 may call and run a computer program from the memory 620 to perform the method in embodiments of the present disclosure.

The memory 620 may be a separate device independent of the processor 610, or may be integrated in the processor 610.

According to embodiments, as shown in FIG. 13, the communication device 600 may further include a transceiver 630, and the processor 610 may control the transceiver 630 to communicate with other devices. Specifically, the transceiver may send information or data to other devices, or receive information or data sent by other devices.

The transceiver 630 may include a transmitter and a receiver. The transceiver 630 may further include one or more antennas.

According to embodiments, the communication device 600 may specifically be the network device according to an embodiment of the present disclosure, and the communication device 600 may implement the corresponding processes implemented by the network device in the method embodiments of the present disclosure.

According to embodiments, the communication device 600 may specifically be the terminal device in embodiments of the present disclosure, and the communication device 600 may implement the corresponding processes implemented by the terminal device in the method embodiments of the present disclosure. For brevity, details are not repeated here.

Figure 14:
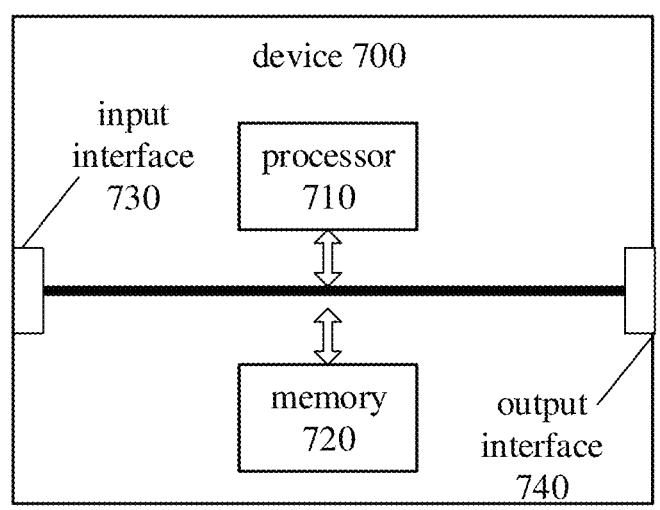
FIG. 14 is a schematic block diagram of a device according to an embodiment of the present disclosure.

FIG. 14 is a schematic structural diagram of a device according to an embodiment of the present disclosure. The device 700 shown in FIG. 14 includes a processor 710, and the processor 710 can call and run a computer program from a memory to implement the method according to embodiments of the present disclosure.

According to embodiments, as shown in FIG. 14, the device 700 may further include a memory 720. The processor 710 may call and run a computer program from the memory 720 to implement the method according to embodiments of the present disclosure.

The memory 720 may be a separate device independent of the processor 710, or may be integrated in the processor 710.

According to embodiments, the device 700 may further include an input interface 730. The processor 710 may control the input interface 730 to communicate with other devices or chips, and specifically, the processor 710 can control the input interface to obtain information or data sent by other devices or chips.

According to embodiments, the device 700 may further include an output interface 740. The processor 710 can control the output interface 740 to communicate with other devices or chips, and specifically, the processor 710 can control the output interface 840 to output information or data to other devices or chips.

According to embodiments, the device can be applied to the terminal device in embodiments of the present disclosure, and the device can implement the corresponding processes implemented by the terminal device in various methods according to embodiments of the present disclosure. For brevity, details are not repeated herein again.

According to embodiments, the device can be applied to the network device in embodiments of the present disclosure, and the device can implement the corresponding processes implemented by the network device in various methods according to embodiments of the present disclosure. For brevity, details are not repeated herein again.

According to embodiments, the device 700 may be a chip. It should be understood that the chip in the embodiments of the present disclosure may also be referred to as a system-level chip, a system chip, a chip system, or a system-on-chip, etc.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

Figure 15:
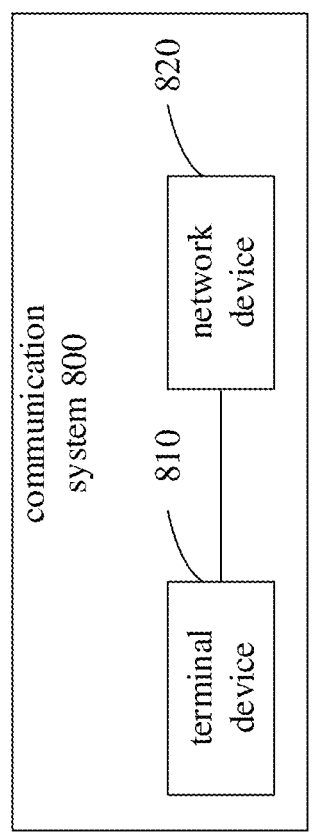
FIG. 15 is a schematic block diagram of a communication system according to an embodiment of the present disclosure.

FIG. 15 is a schematic block diagram of a communication system 800 according to an embodiment of the present disclosure. As shown in FIG. 15, the communication system 700 includes a terminal device 810 and a network device 820.

The terminal device 810 can be used to implement the corresponding functions implemented by the terminal device in the above methods, and the network device 820 can be used to implement the corresponding functions implemented by the network device in the above methods. For brevity, repeated descriptions are omitted here.

An embodiment of the present disclosure also provides a computer-readable storage medium for storing computer programs.

According to embodiments, the computer-readable storage medium may be applied to the terminal device in embodiments of the present disclosure, and the computer programs cause a computer to perform the corresponding processes implemented by the terminal device in each method embodiment of the present disclosure. For brevity, repeated descriptions are omitted here.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

An embodiment of the present disclosure provides a computer program product, including computer program instructions.

According to embodiments, the computer program product may be applied to the terminal device in embodiments of the present disclosure, and the computer program instructions cause a computer to perform the corresponding processes implemented by the terminal device in each method embodiment of the present disclosure. For brevity, repeated descriptions are omitted here.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

An embodiment of the present disclosure also provides a computer program.

According to embodiments, the computer program may be applied to the terminal device in embodiments of the present disclosure, and when the computer program runs on a computer, the computer is caused to perform the corresponding processes implemented by the terminal device in each method embodiment of the present disclosure. For brevity, repeated descriptions are omitted here.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A data transmission method, comprising:
    determining, by a terminal device, a number of Transmission Configuration Indicator (TCI) states according to Downlink Control Information (DCI);
    determining, by the terminal device, at least one of: a first repetition number of repetitions of a Physical Downlink Shared Channel (PDSCH) scheduled by the DCI or a redundancy version used for each repetition of the PDSCH scheduled by the DCI according to the number of the TCI states; and
    performing, by the terminal device, repetitions of the PDSCH scheduled by the DCI according to at least one of: the first repetition number or the redundancy version;
    wherein determining, by the terminal device, the redundancy version used for each repetition of the PDSCH scheduled by the DCI according to the number of the TCI states, comprises:
    in response to that the number of the TCI states is equal to 1, determining, by the terminal device, the redundancy version used for each repetition of the PDSCH scheduled by the DCI according to redundancy version indication information in the DCI or a redundancy version sequence indicated by Radio Resource Control (RRC) signaling; or
    in response to that the number of the TCI states is greater than 1, determining, by the terminal device, redundancy versions used for repetitions of the PDSCH using different TCI states according to the redundancy version indication information in the DCI.

2. The method according to claim 1, wherein determining, by the terminal device, the first repetition number of the repetitions of the PDSCH scheduled by the DCI according to the number of the TCI states, comprises:
    determining, by the terminal device, the number of the TCI states as the first repetition number.

3. The method according to claim 1, wherein determining, by the terminal device, the redundancy versions used for repetitions of the PDSCH using different TCI states according to the redundancy version indication information in the DCI, comprises:
    determining, by the terminal device, a redundancy version used for a repetition of the PDSCH using a first TCI state according to the redundancy version indication information, wherein the TCI states comprise at least the first TCI state and a second TCI state; and
    determining, by the terminal device, a redundancy version used for a repetition of the PDSCH using the second TCI state according to the redundancy version used for the repetition of the PDSCH using the first TCI state.

4. The method according to claim 1, wherein there is a cyclic shift relationship among the redundancy versions used for the repetitions of the PDSCH using different TCI states.

5. A network device, comprising:
    a memory for storing computer programs;
    a processor; and
    a transceiver;
    wherein the processor is configured to execute the computer programs to cause the network device to:
    according to a number of Transmission Configuration Indicator (TCI) states for transmitting a Physical Downlink Shared Channel (PDSCH), determine at least one of: a first repetition number of repetitions of the PDSCH or a redundancy version used for each repetition of the PDSCH; and
    perform, by the network device, repetitions of the PDSCH according to at least one of: the first repetition number or the redundancy version;
    wherein the processor is configured to execute the computer programs to cause the network device to:
    in response to that the number of the TCI states is equal to 1, determine the redundancy version used for each repetition of the PDSCH scheduled by Downlink Control Information (DCI) according to redundancy version indication information in the DCI or a redundancy version sequence indicated by Radio Resource Control (RRC) signaling; or
    in response to that the number of the TCI states is greater than 1, determine redundancy versions used for repetitions of the PDSCH using different TCI states according to the redundancy version indication information in the DCI.

6. A terminal device, comprising:
    a memory for storing computer programs;
    a processor; and
    a transceiver;
    wherein the processor is configured to execute the computer programs to:
    determine a number of Transmission Configuration Indicator (TCI) states according to Downlink Control Information (DCI);
    determine at least one of: a first repetition number of repetitions of a Physical Downlink Shared Channel (PDSCH) scheduled by the DCI or a redundancy version used for each repetition of the PDSCH scheduled by the DCI according to the number of the TCI states; and
    wherein the transceiver is configured to perform repetitions of the PDSCH scheduled by the DCI according to at least one of: the first repetition number or the redundancy version;
    wherein the processor is configured to execute the computer programs to:
    in response to that the number of the TCI states is equal to 1, determine the redundancy version used for each repetition of the PDSCH scheduled by the DCI according to redundancy version indication information in the DCI or a redundancy version sequence indicated by Radio Resource Control (RRC) signaling; or
    in response to that the number of the TCI states is greater than 1, determine redundancy versions used for repetitions of the PDSCH using different TCI states according to the redundancy version indication information in the DCI.

7. The terminal device according to claim 6, wherein the processor is configured to:
   determine the number of the TCI states as the first repetition number.

8. The terminal device according to claim 6, wherein the processor is configured to:
   determine a redundancy version used for a repetition of the PDSCH using a first TCI state according to the redundancy version indication information, wherein the TCI states comprise at least the first TCI state and a second TCI state; and
   determine a redundancy version used for a repetition of the PDSCH using the second TCI state according to the redundancy version used for the repetition of the PDSCH using the first TCI state.

9. The terminal device according to claim 6, wherein there is a cyclic shift relationship among the redundancy versions used for the repetitions of the PDSCH using different TCI states.

\* \* \* \* \*